US012457364B2

(12) United States Patent
Xiu et al.

(10) Patent No.: US 12,457,364 B2
(45) Date of Patent: *Oct. 28, 2025

(54) METHODS AND APPARATUS ON TRANSFORM AND COEFFICIENT SIGNALING

(71) Applicant: BEIJING DAJIA INTERNET INFORMATION TECHNOLOGY CO., LTD., Beijing (CN)

(72) Inventors: Xiaoyu Xiu, Beijing (CN); Tsung-Chuan Ma, Beijing (CN); Yi-Wen Chen, Beijing (CN); Xianglin Wang, Beijing (CN); Hong-Jheng Jhu, Beijing (CN); Bing Yu, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/650,739

(22) Filed: Apr. 30, 2024

(65) Prior Publication Data
US 2024/0292033 A1    Aug. 29, 2024

Related U.S. Application Data

(63) Continuation of application No. 17/750,169, filed on May 20, 2022, now Pat. No. 12,015,798, which is a
(Continued)

(51) Int. Cl.
*H04N 19/00* (2014.01)
*H04N 19/129* (2014.01)
(Continued)

(52) U.S. Cl.
CPC ......... *H04N 19/625* (2014.11); *H04N 19/129* (2014.11); *H04N 19/176* (2014.11); *H04N 19/46* (2014.11)

(58) Field of Classification Search
CPC .. H04N 19/625; H04N 19/129; H04N 19/176; H04N 19/46; H04N 19/14;
(Continued)

(56) References Cited

U.S. PATENT DOCUMENTS 11,122,290 B2 * 9/2021 Jang ..................... H04N 19/182
12,015,798 B2    6/2024 Xiu et al.
(Continued)

FOREIGN PATENT DOCUMENTS

CN          103650510 A      3/2014
CN          106105206 A      11/2016
(Continued)

OTHER PUBLICATIONS

Office Action issued in Indian Application No. 202247028937, mailed on May 2, 2024 (2 Pages).
(Continued)

*Primary Examiner* — Frank F Huang
(74) *Attorney, Agent, or Firm* — Osha Bergman Watanabe & Burton LLP

(57) ABSTRACT

A method for video encoding includes determining whether any coding group of a transform block located within a zero-out region has a non-zero coefficient. The transform block comprises a non-zero region and the zero-out region. Further, in accordance with a determination that no coding group of the transform block located within the zero-out region has a non-zero coefficient, the method includes applying respective inverse transforms to transform coefficients of the transform block in both horizontal and vertical directions.

18 Claims, 11 Drawing Sheets

Related U.S. Application Data continuation of application No. PCT/US2020/061843, filed on Nov. 23, 2020.

(60) Provisional application No. 62/959,325, filed on Jan. 10, 2020, provisional application No. 62/938,890, filed on Nov. 21, 2019.

(51) Int. Cl.
  *H04N 19/176* (2014.01)
  *H04N 19/46* (2014.01)
  *H04N 19/625* (2014.01)

(58) Field of Classification Search
  CPC ...... H04N 19/12; H04N 19/18; H04N 19/186; H04N 19/70
  See application file for complete search history.

(56) References Cited

U.S. PATENT DOCUMENTS

| | | | |
|---|---|---|---|
| 2015/0078432 A1 | 3/2015 | Wang et al. | |
| 2015/0264403 A1 | 9/2015 | Chong et al. | |
| 2016/0080749 A1 | 3/2016 | He et al. | |
| 2018/0184131 A1 | 6/2018 | Yoo et al. | |
| 2018/0213258 A1 | 7/2018 | Xu et al. | |
| 2018/0332289 A1* | 11/2018 | Huang | H04N 19/96 |
| 2019/0349587 A1* | 11/2019 | Jang | H04N 19/124 |
| 2019/0387241 A1* | 12/2019 | Kim | H04N 19/46 |
| 2020/0068195 A1* | 2/2020 | Yoo | H04N 19/117 |
| 2020/0177901 A1* | 6/2020 | Choi | H04N 19/122 |
| 2020/0177921 A1* | 6/2020 | Koo | H04N 19/18 |
| 2020/0374531 A1* | 11/2020 | Zhao | H04N 19/119 |
| 2021/0014534 A1* | 1/2021 | Koo | H04N 19/625 |
| 2021/0144376 A1* | 5/2021 | Tsukuba | H04N 19/139 |
| 2021/0211729 A1* | 7/2021 | Koo | H04N 19/18 |
| 2021/0218996 A1* | 7/2021 | Koo | H04N 19/176 |
| 2022/0303542 A1* | 9/2022 | Paluri | H04N 19/186 |

FOREIGN PATENT DOCUMENTS

| | | |
|---|---|---|
| CN | 109661819 A | 4/2019 |
| CN | 110324619 A | 10/2019 |
| WO | 2021096172 A1 | 5/2021 |

OTHER PUBLICATIONS

Office Action issued in Korean Application No. 10-2022-7017329, mailed on Jul. 11, 2023 (10 Pages).
Extended European Search Report issued in European Application No. 20889028.5, mailed on Jul. 18, 2023 (6 pages).
Koo M et al.; "Description of SDR video coding technology proposal by LG Electronics;" f10. JVET Meeting; Apr. 10, 2018-Apr. 20, 2018; San Diego; The Joint Video Exploration Team of ISO/IEC JTC1/SC29/WG11 and ITU-T SG.16; No. JVET-J0017; Apr. 11, 2018 (92 pages).
Chen, et al.; "Algorithm Description of Joint Exploration Test Model 7 (JEM7)"; MPEG Meeting; Jul. 17, 2017-Jul. 21, 2017; Torino; Motion Picture Expert Group or ISO/IEC JTC1/SC29/WVG11; No. nl7055; XP_30023716A; Oct. 6, 2017 (48 pages).
Tsukuba (Sony) T et al.; "CE8-2.1: Transform Skip for Chroma with limiting maximum number of context-coded bin in TS residual coding"; 16. JVET Meeting; Oct. 10, 2019-Oct. 11, 2019; Geneva; The Joint Video Exploration Team of ISO/IEC JTC1/SC29/WG11 and ITU-T SG.16; No. JVET-P0058; m49999; Oct. 3, 2019 (10 pages).
Koo (LGE) M et al.; "CE 6-1.1 (c,d): Fast DST-7/DCT-8 based on DFT and 32 point MTS based on skipping high frequency coefficients"; 12. JVET Meeting; Oct. 3, 2018-Oct. 12, 2018; Maceo; The Joint Video Exploration Team of ISO/ IEC JTC1/SC29/WG11 and ITU-T SG.16; No. JVET-L0132; Oct. 3, 2018 (7 pages).
Koo (LGE) M et al.; "CE 6.1.11: AMT replacement and restriction", 11. JVET Meeting; Jul. 11, 2018-Jul. 18, 2018; Ljubljana; The Joint Video Exploration Team of ISO/IEC JTC1/SC29/WG11and ITU-T SG. 16; No. JVET-K0096; Jul. 10, 2018 (12 pages).
Office Action issued in European Application No. 20889028.5, mailed on Jul. 28, 2023 (6 Pages).
Office Action issued in Chinese Application No. 202211534362.X, mailed on Aug. 25, 2023 (7 pages).
Chinese Search Report issued in Application No. 202211534362X, mailed on Aug. 25, 2023 (4 pages).
Chinese Search Report issued in Application No. 202211534362X, mailed on Nov. 16, 2023 (13 pages).
First Office Action issued for corresponding Japanese Patent Application 2023-118339 mailed on Aug. 20, 2024. (8 pages).
Jianle Chen et al., "Algorithm description for Versatile Video Coding and Test Model 2 (VTM 2)", Joint Video Experts Team (JVET) Oct. 2, 2018, [JVET-K1002-v2] (version 3) (6 pages).
First Office Action issued on Sep. 9, 2024 for counterpart Vietnam patent application No. 1-2022-03185 (3 pages).
First Office Action issued for corresponding Japanese Patent Application 2023-118337 mailed on Aug. 20, 2024 (8 pages.
Notification of Reasons for Refusal issued in Japanese Application No. 2023-118337, mailed on Feb. 18, 2025 (5 pages).
Notification of Reasons for Refusal issued in Japanese Application No. 2023-118339, mailed on Feb. 18, 2025 (5 pages).
Office Action issued in related U.S. Appl. No. 18/651,295, mailed on Feb. 27, 2025 (27 pages).

* cited by examiner

METHODS AND APPARATUS ON TRANSFORM AND COEFFICIENT SIGNALING

CROSS-REFERENCE TO RELATED APPLICATIONS

The present application is a continuation of U.S. patent application Ser. No. 17/750,169, entitled "METHODS AND APPARATUS ON TRANSFORM AND COEFFICIENT SIGNALING" filed on May 20, 2022, which is a continuation of PCT Application No. PCT/US2020/061843, entitled "METHODS AND APPARATUS ON TRANSFORM AND COEFFICIENT SIGNALING" filed on Nov. 23, 2020, which claims priority to (i) U.S. Provisional Patent Application No. 62/938,890, entitled "METHODS AND APPARATUS ON TRANSFORM AND COEFFICIENT SIGNALING" filed Nov. 21, 2019, and (ii) U.S. Provisional Patent Application No. 62/959,325, entitled "METHODS AND APPARATUS ON TRANSFORM AND COEFFICIENT SIGNALING" filed Jan. 10, 2020, all of which are incorporated by reference in its entirety.

TECHNICAL FIELD

The present application generally relates to video coding and compression, and more specifically, to methods and apparatus on improving and simplifying existing designs of transform and coefficient coding methods in the versatile video coding (VVC) standard.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and apparatus on improving and simplifying existing designs of transform and coefficient coding methods.

According to a first aspect of the present application, a method of decoding video data includes receiving bitstream encoding a transform block, wherein the transform block includes a non-zero region and a zero-out region; checking whether there is any non-zero coefficient within the zero-out region; in accordance with a determination that there is no non-zero coefficient within the zero-out region of the transform block: determining a scan order index of a last non-zero coefficient of the transform block along a scanning direction; in accordance with a determination that the scan order index of the last non-zero coefficient is greater than a predefined threshold: receiving, from the bitstream, a value for multiple transform selection (MTS) index; and applying respective transforms to transform coefficients of the transform block in both horizontal and vertical directions based on the value of the MTS index.

According to a second aspect of the present application, an electronic apparatus includes one or more processing units, memory and a plurality of programs stored in the memory. The programs, when executed by the one or more processing units, cause the electronic apparatus to perform the method of decoding video data as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
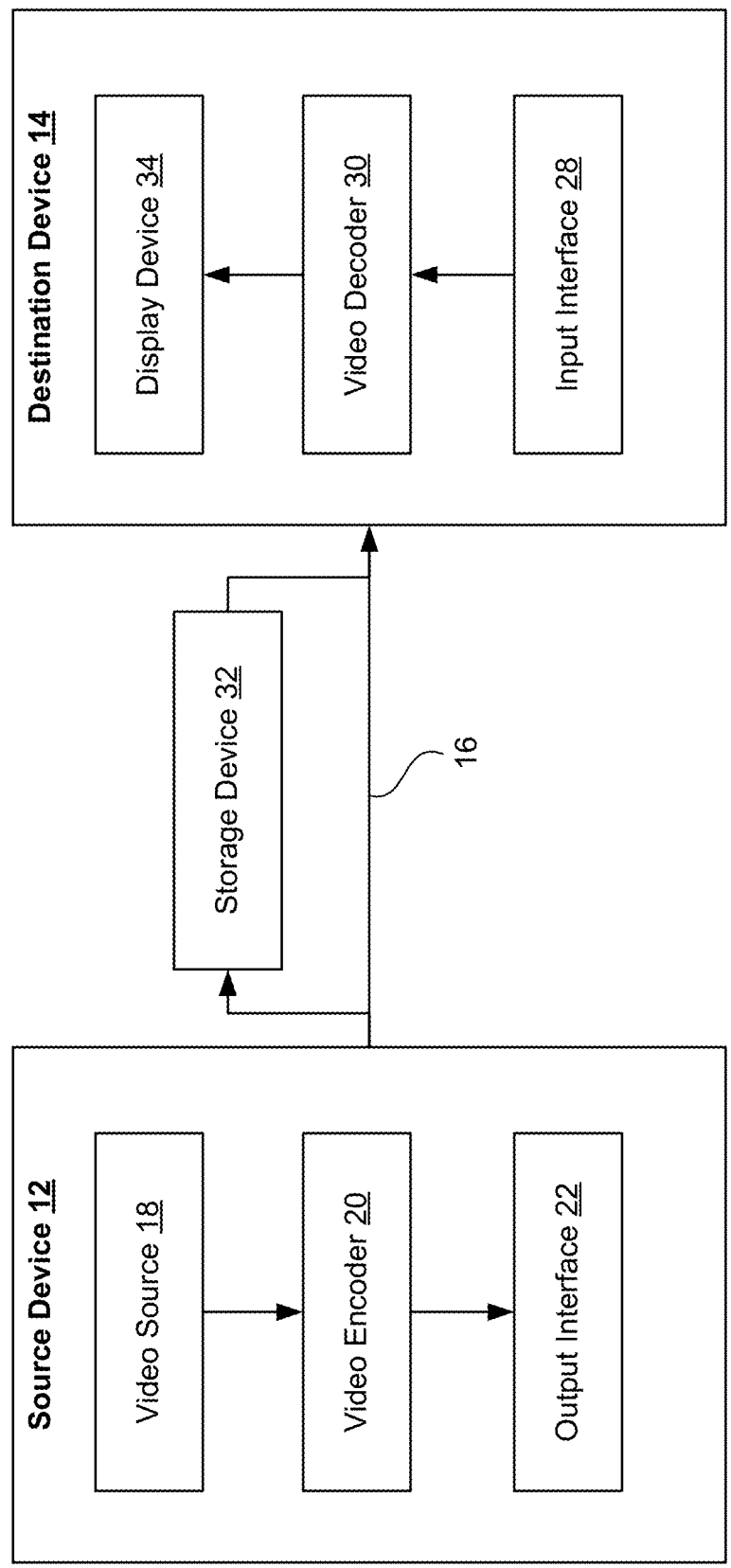
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
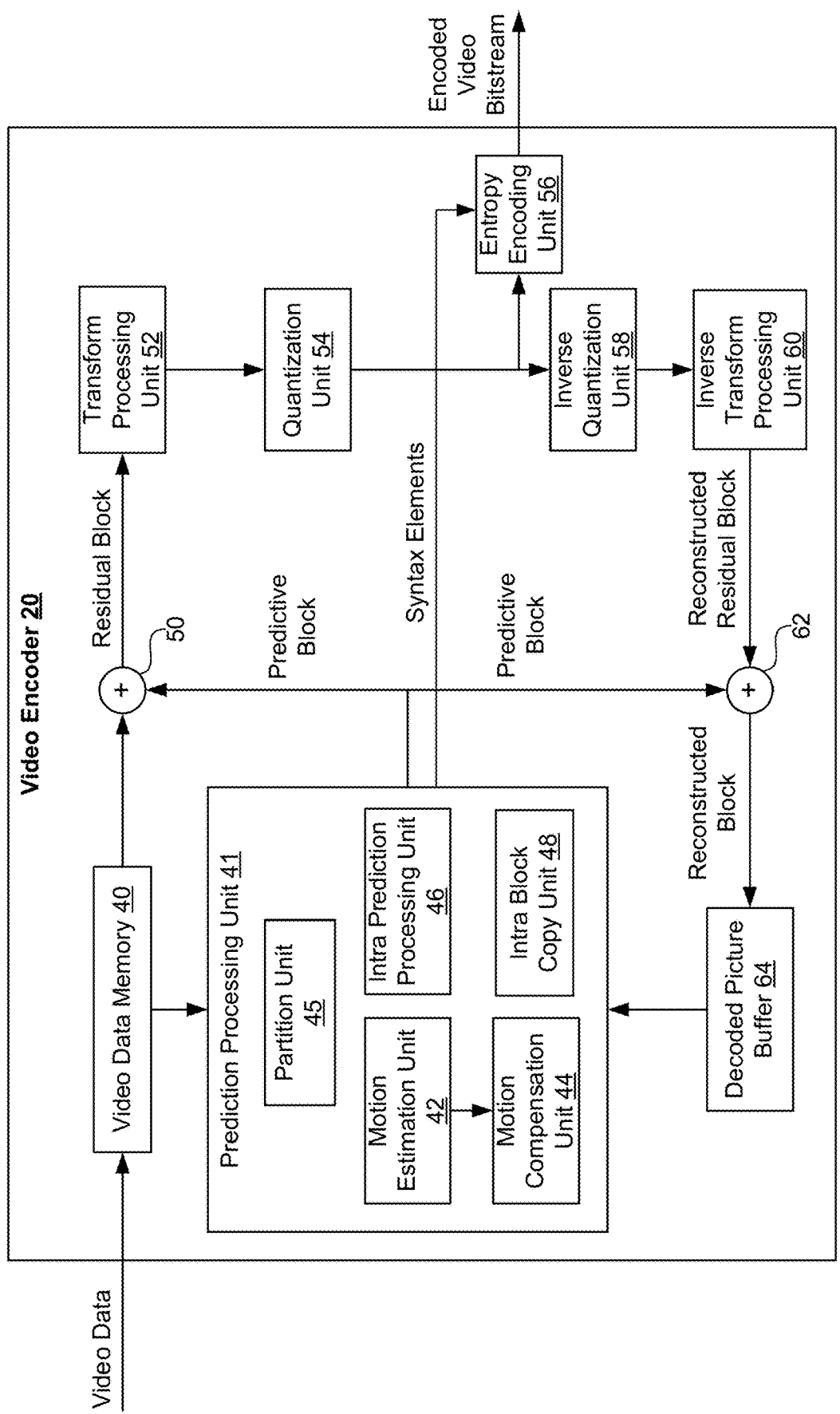
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
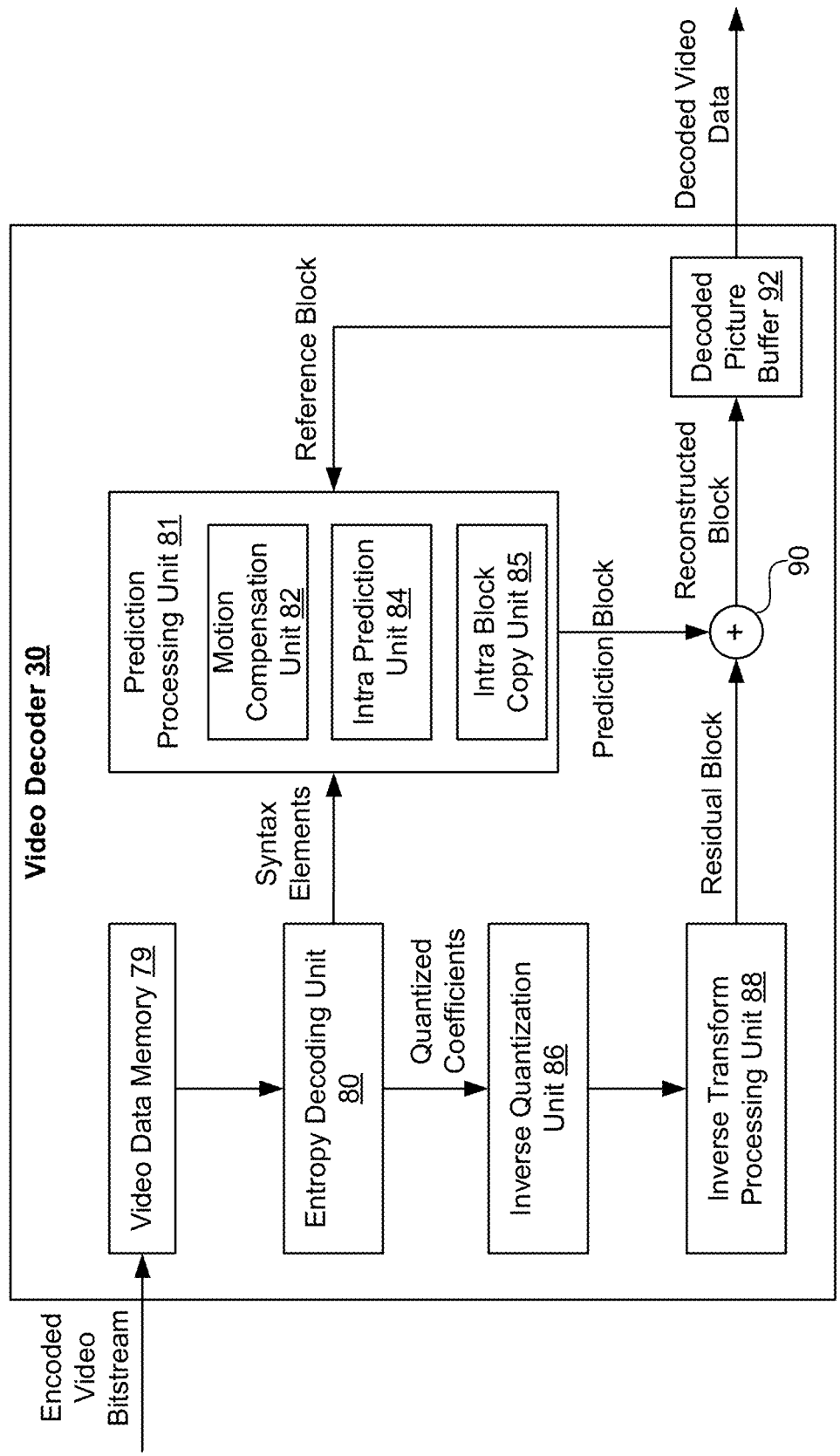
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction processing unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction processing unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
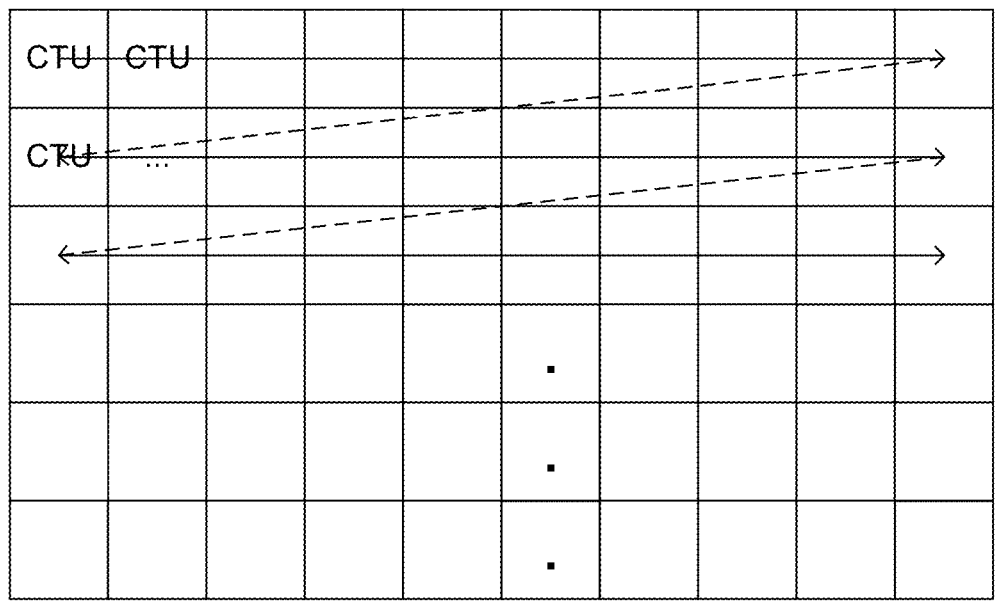
FIGS. 4A through 4E are block diagrams illustrating how a frame is recursively partitioned into multiple video blocks of different sizes and shapes in accordance with some implementations of the present disclosure.
Figure 4B:
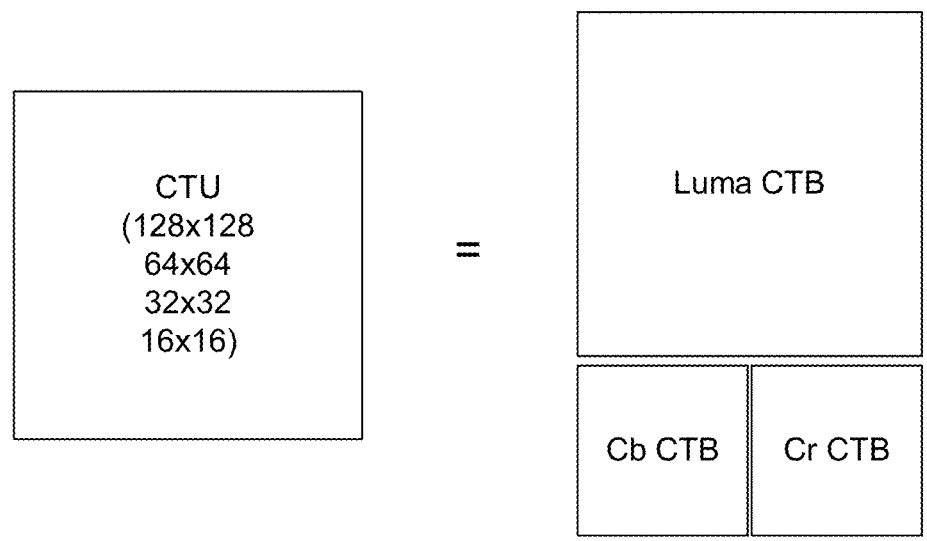

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
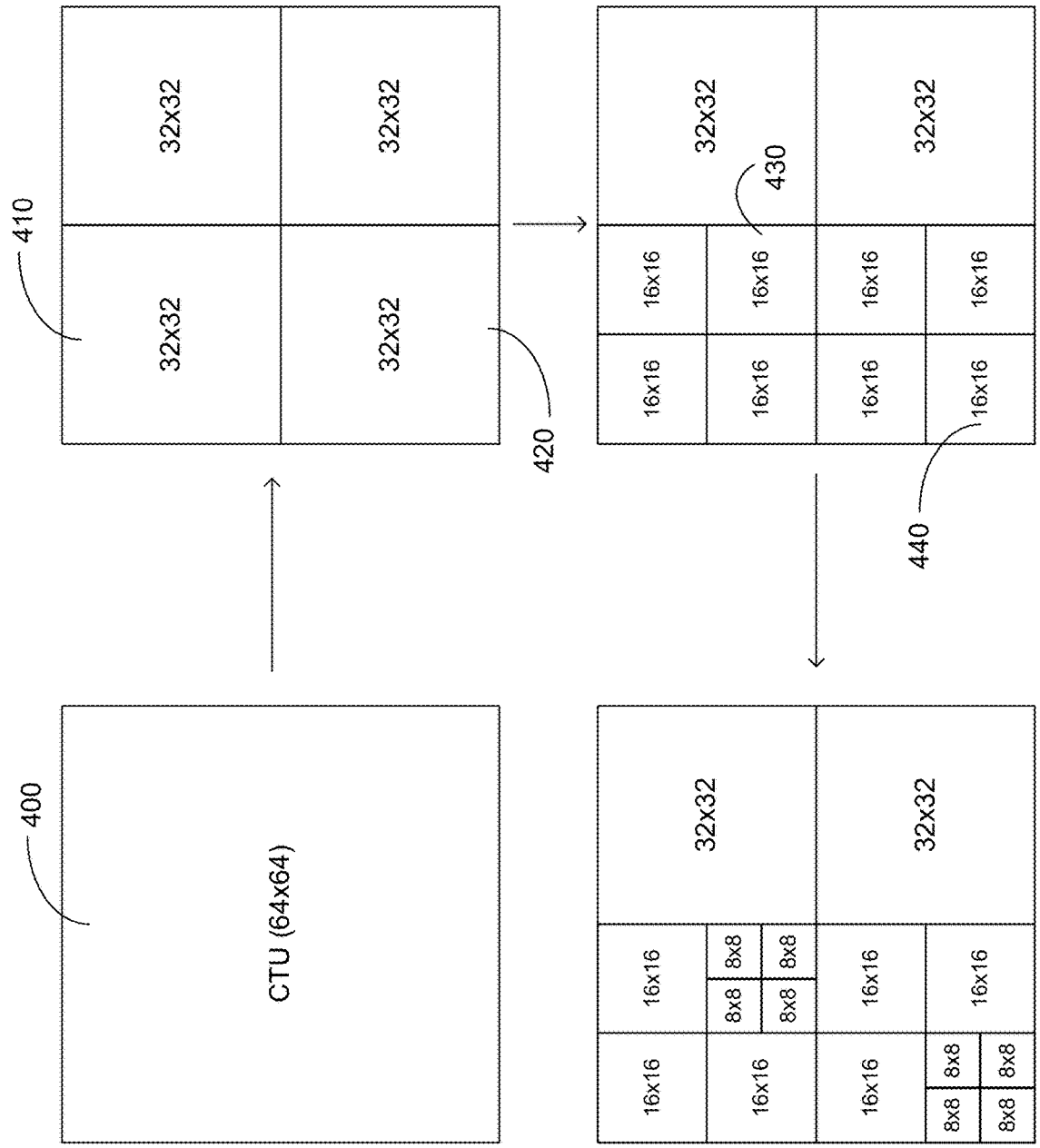
Figure 4D:
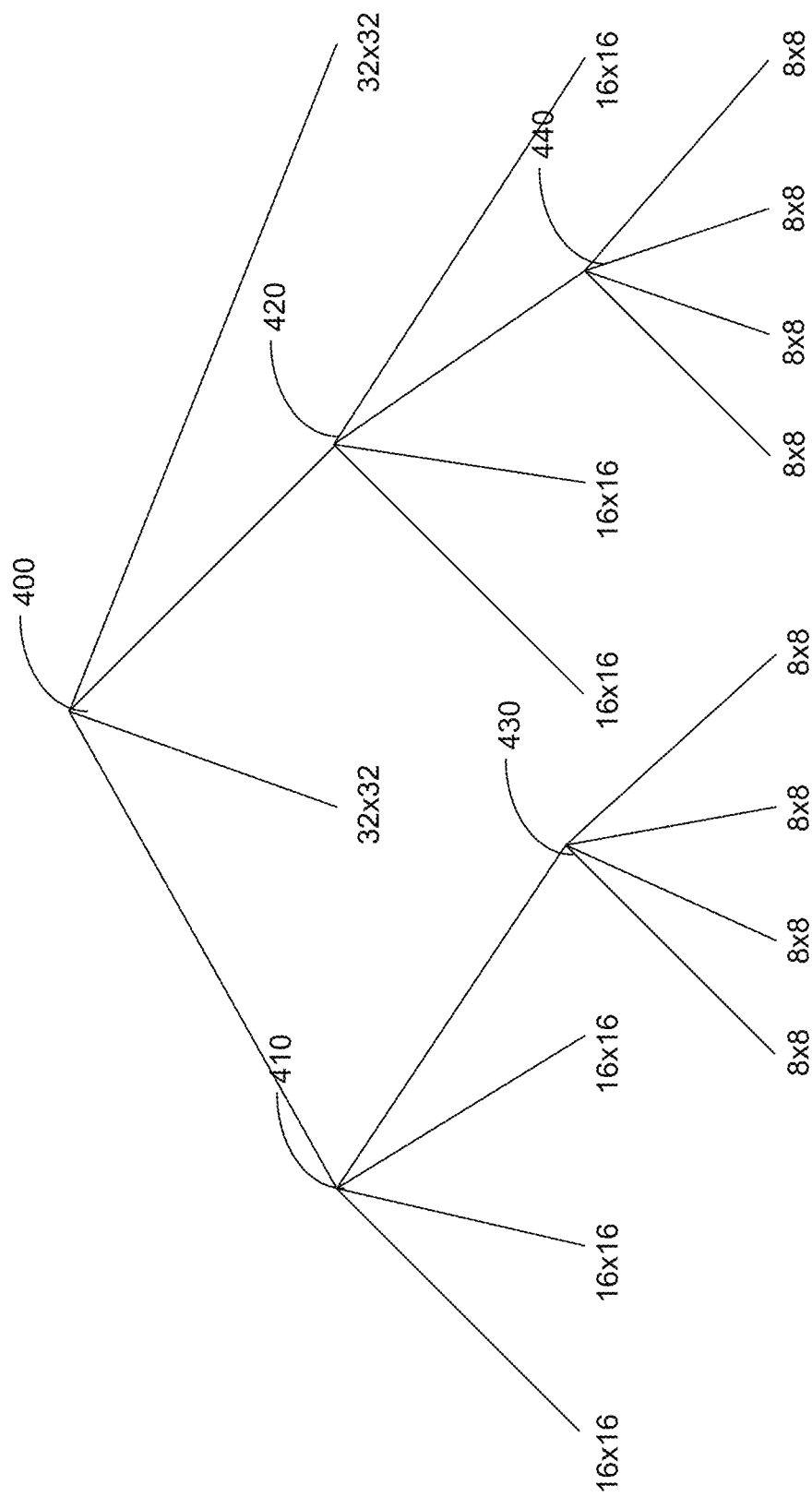
Figure 4E:
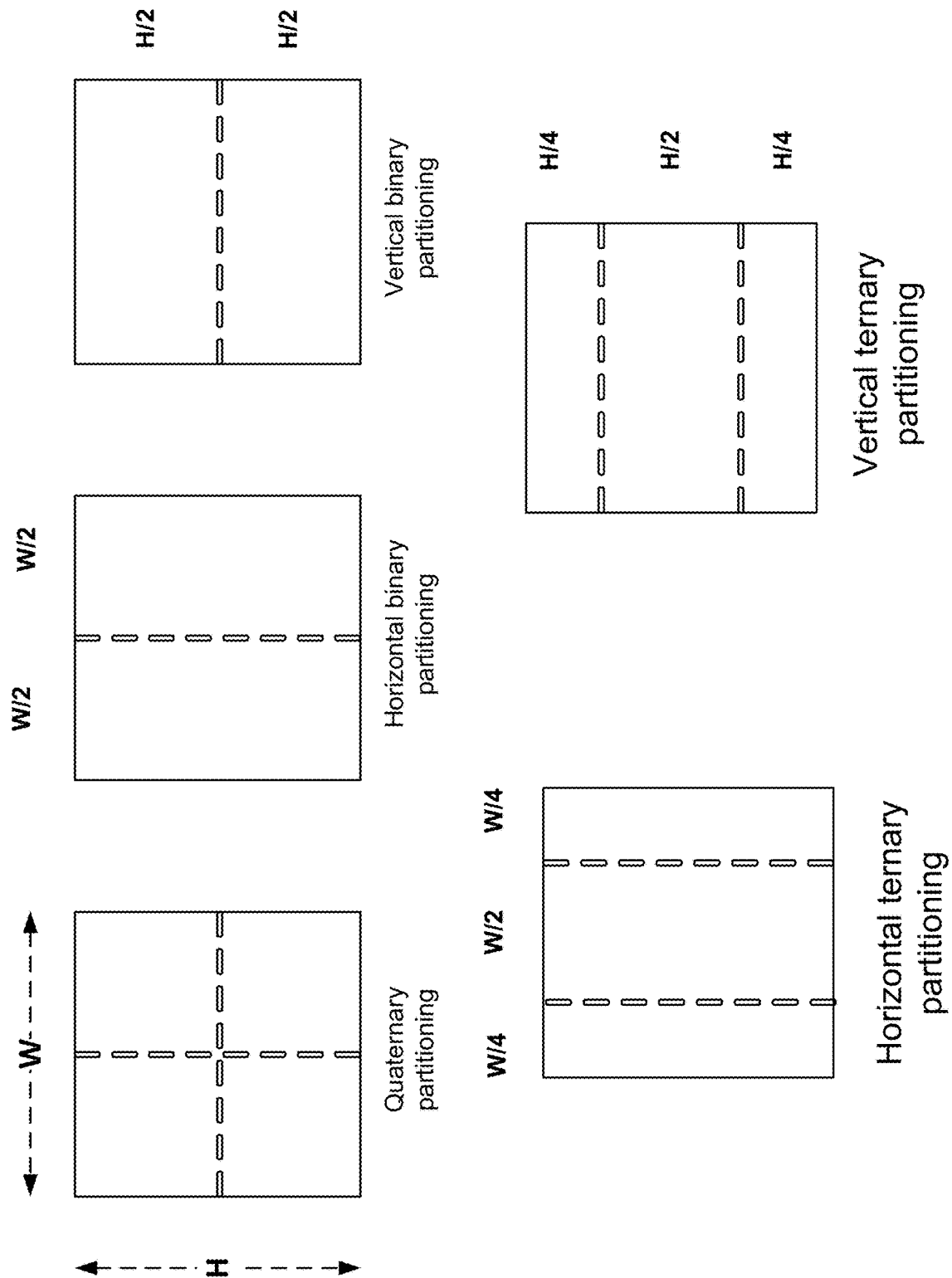

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). Palette-based coding is another coding scheme that has been adopted by many video coding standards. In palette-based coding, which may be particularly suitable for screen-generated content coding, a video coder (e.g., video encoder 20 or video decoder 30) forms a palette table of colors representing the video data of a given block. The palette table includes the most dominant (e.g., frequently used) pixel values in the given block. Pixel values that are not frequently represented in the video data of the given block are either not included in the palette table or included in the palette table as escape colors.

Each entry in the palette table includes an index for a corresponding pixel value that in the palette table. The palette indices for samples in the block may be coded to indicate which entry from the palette table is to be used to predict or reconstruct which sample. This palette mode starts with the process of generating a palette predictor for a first block of a picture, slice, tile, or other such grouping of video blocks. As will be explained below, the palette predictor for subsequent video blocks is typically generated by updating a previously used palette predictor. For illustrative purpose, it is assumed that the palette predictor is defined at a picture level. In other words, a picture may include multiple coding blocks, each having its own palette table, but there is one palette predictor for the entire picture.

To reduce the bits needed for signaling palette entries in the video bitstream, a video decoder may utilize a palette predictor for determining new palette entries in the palette table used for reconstructing a video block. For example, the palette predictor may include palette entries from a previously used palette table or even be initialized with a most recently used palette table by including all entries of the most recently used palette table. In some implementations, the palette predictor may include fewer than all the entries from the most recently used palette table and then incorporate some entries from other previously used palette tables. The palette predictor may have the same size as the palette tables used for coding different blocks or may be larger or smaller than the palette tables used for coding different blocks. In one example, the palette predictor is implemented as a first-in-first-out (FIFO) table including 64 palette entries.

To generate a palette table for a block of video data from the palette predictor, a video decoder may receive, from the encoded video bitstream, a one-bit flag for each entry of the palette predictor. The one-bit flag may have a first value (e.g., a binary one) indicating that the associated entry of the palette predictor is to be included in the palette table or a second value (e.g., a binary zero) indicating that the associated entry of the palette predictor is not to be included in the palette table. If the size of palette predictor is larger than the palette table used for a block of video data, then the video decoder may stop receiving more flags once a maximum size for the palette table is reached.

In some implementations, some entries in a palette table may be directly signaled in the encoded video bitstream instead of being determined using the palette predictor. For such entries, the video decoder may receive, from the encoded video bitstream, three separate m-bit values indicating the pixel values for the luma and two chroma components associated with the entry, where m represents the bit depth of the video data. Compared with the multiple m-bit values needed for directly signaled palette entries, those palette entries derived from the palette predictor only require a one-bit flag. Therefore, signaling some or all palette entries using the palette predictor can significantly reduce the number of bits needed to signal the entries of a new palette table, thereby improving the overall coding efficiency of palette mode coding.

In many instances, the palette predictor for one block is determined based on the palette table used to code one or more previously coded blocks. But when coding the first coding tree unit in a picture, a slice or a tile, the palette table of a previously coded block may not be available. Therefore a palette predictor cannot be generated using entries of the previously used palette tables. In such case, a sequence of palette predictor initializers may be signaled in a sequence parameter set (SPS) and/or a picture parameter set (PPS), which are values used to generate a palette predictor when a previously used palette table is not available. An SPS generally refers to a syntax structure of syntax elements that apply to a series of consecutive coded video pictures called a coded video sequence (CVS) as determined by the content of a syntax element found in the PPS referred to by a syntax element found in each slice segment header. A PPS generally refers to a syntax structure of syntax elements that apply to one or more individual pictures within a CVS as determined by a syntax element found in each slice segment header. Thus, an SPS is generally considered to be a higher level syntax structure than a PPS, meaning the syntax elements included in the SPS generally change less frequently and apply to a larger portion of video data compared to the syntax elements included in the PPS.

Figure 5:
FIG. 5 is a table illustrating an exemplary multiple transform selection (MTS) scheme for transforming residuals of inter and intra coded blocks in accordance with some implementations of the present disclosure.

FIG. 5 is a table 500 illustrating an exemplary multiple transform selection (MTS) scheme for transforming residuals of inter and intra coded blocks in accordance with some implementations of the present disclosure. For example, during encoding, the video encoder 20 performs MTS with the transform processing unit 52 of FIG. 2. During decoding, the video decoder 30 performs inverse transform using the corresponding inverse transform method with the inverse transform processing unit 88 of FIG. 3.

The current VVC specification adopts MTS scheme for transforming residuals in both inter and intra coded blocks. If MTS is used, during encoding, a video encoder selects one of many transform methods to apply to the residuals of a coded block. For example, the video encoder may apply the DCT2 transform (e.g., MTS is disabled), the DCT8 transform, or the DST7 transform to residuals of a coded block. A group of syntax elements (e.g., MTS_CU_flag, MTS_Hor_flag, MTS_Ver_flag) (also known as flags) are used to signal the specific transform method used for the coded block.

In some embodiments, two syntax elements are specified at the sequence level (e.g., included in the sequence parameter set (SPS)) to enable MTS for intra and inter modes, separately. When MTS is enabled at the sequence level, another CU-level syntax element (e.g., MTS_CU_flag of table 500) is further signaled to indicate whether MTS is applied for a particular CU.

In some embodiments, MTS is only used when a plurality of criteria related to characteristics of the coding block are satisfied, including: 1) both the width and the height of the coding block are smaller than or equal to a predefined value (e.g., 32); 2) the coding block is a luma coding block (e.g., the luma CBF flag==1 as MTS is sued only in luma residual coding); and 3) the horizontal and vertical coordinates of a last non-zero coefficient are both smaller than a predefined value (e.g., 16) (e.g., the last non-zero coefficient is confined to a predefined top-left region of the transform block). If any one of the above criteria is not satisfied, the video encoder does not apply MTS but rather a default transform method such as DCT2 transform to transform the block residuals, and a corresponding syntax element is set to indicate that the default transform is used (e.g., MTS_CU_flag==0 and MTS_Hor_flag and MTS_Ver_flag are not signaled).

Table 500 illustrates syntax element values and the corresponding transform method being used in MTS. If DCT2 transform is used to transform the block residuals, MTS_CU_flag is set to 0 and MTS_Hor_flag and MTS_Ver_flag are not signaled. If MTS_CU_flag is set to 1 (e.g., indicating that DCT8 and/or DST7 are being used), then two other syntax elements (e.g., MTS_Hor_flag, MTS_Ver_flag) are additionally signaled to indicate the transform type for the horizontal and vertical directions, respectively. When MTS_Hor_flag==1 or MTS_Ver_flag==1, the respective horizontal or vertical component is transformed using DST7 method. When MTS_Hor_flag==0 or MTS_Ver_flag==0, the respective horizontal or vertical component is transformed using DCT8 method.

In some embodiments, all MTS transform coefficients are encoded in 6-bit precision, which is the same as the DCT2 core transform. Given that the VVC supports all the transform sizes used in the HEVC, all the transform cores used in the HEVC are kept the same as in the VVC, including 4-point, 8-point, 16-point and 32-point DCT2 transforms and 4-point DST7 transform. Meanwhile, other transform cores including 64-point DCT2, 4-point DCT8, 8-point, 16-point, 32-point DST7 and DCT8 are additionally supported in the VVC transform design.

Furthermore, to reduce the computational complexity of large size DST7 or DCT8 transform, transform coefficients (e.g., high frequency transform coefficients) that are located outside a low-frequency region (e.g., the top-left 16×16 region of a transform block) are set to zeros (e.g., zero-out operation) for DST7 and DCT8 transform blocks when either width or height of the block is equal to 32.

In some embodiments, transform coefficients of a transform block are coded using non-overlapped coefficient group (CGs). The CG size is determined based on the size of the transform block. The CGs within a transform block and the transform coefficients within each CG are coded based on one pre-defined scan order (e.g., a diagonal scan order).

Figure 6:
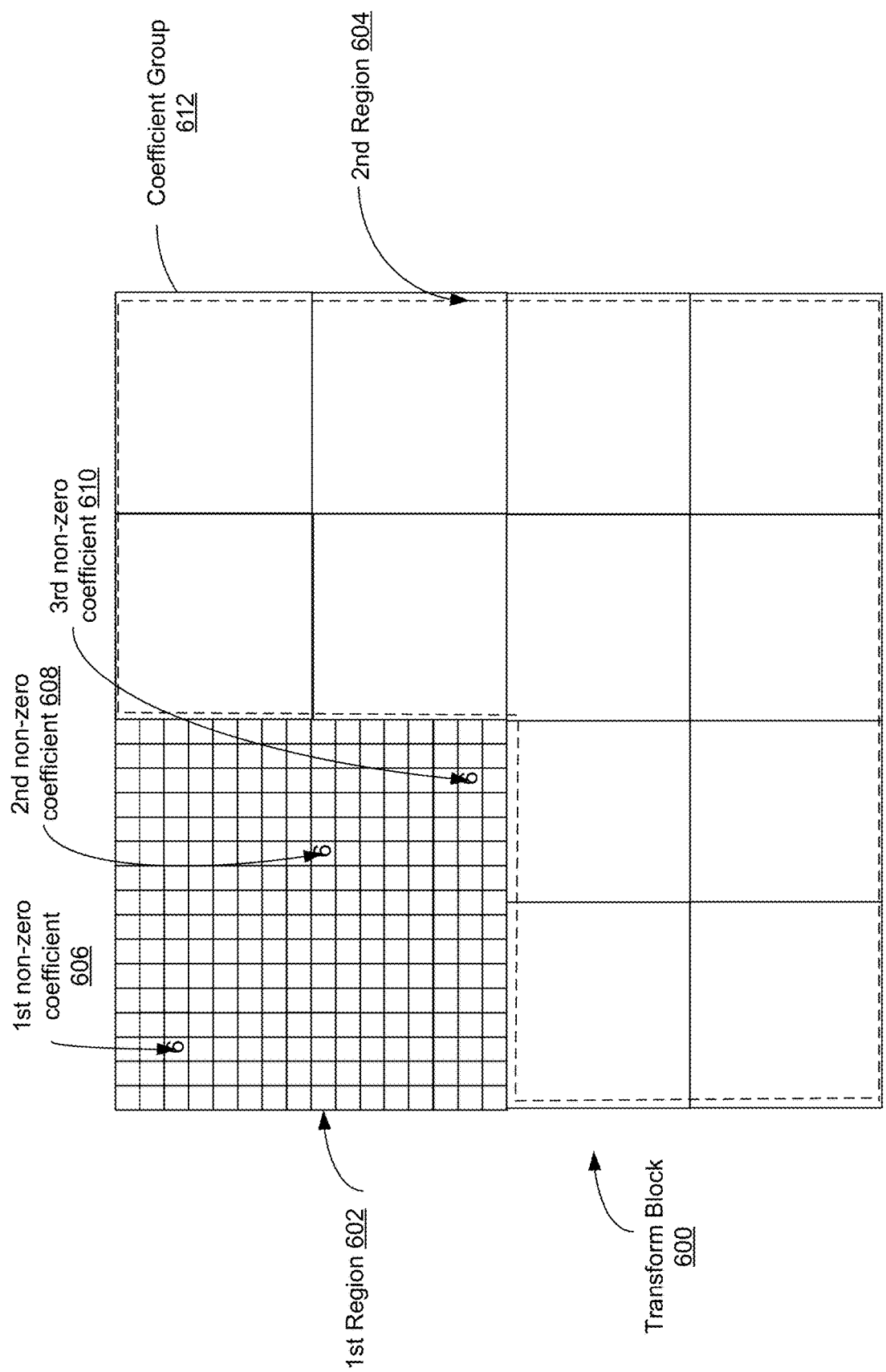
FIG. 6 is a block diagram illustrating an exemplary transform block with non-zero transform coefficients in accordance with some implementations of the present disclosure.

FIG. 6 is a block diagram illustrating an exemplary transform block 600 with non-zero transform coefficients in accordance with some implementations of the present disclosure. Transform block 600 includes a first region 602 corresponding to the top-left meshed portion of the transform block 600 and a second region 604 represented by the dashed-line portion of the transform block 600. The first region 602 has a predefined size (e.g., a top-left 16×16 region) of the transform block 600 and includes one or more non-zero transform coefficients (e.g., 1st, 2nd, and 3rd non-zero coefficients 606, 608, and 610). The second region 604 is a region outside the first region 602 that may or may not include one or more non-zero transform coefficients.

As described in FIG. 5, the video encoder/decoder may use MTS to transform residuals (e.g., luma residuals) in both intra and inter modes (e.g., DCT8 or DST7 transform). Additionally, the video encoder/decoder uses MTS only when the following criteria are satisfied: (1) both the width and the height of the coding block are smaller than or equal to a predefined value (e.g., 32); (2) the coding block is a luma coding block (e.g., the luma CBF flag==1 as MTS applies only to luma residual coding); and (3) the horizontal and vertical coordinates of the last non-zero coefficient (e.g., the 3rd non-zero coefficient 610) are both smaller than a predefined value (e.g., 16), i.e., within the first region 602.

In some embodiments, when the three criteria listed above are satisfied, MTS may be enabled even if there is only one non-zero transform coefficient in a predefined top-left region (e.g., the 1st region 602) of the transform block. In other embodiments, since MTS coding gains come from the proper selection of one non-DCT2 transform that leads to better energy compaction than DCT2 transform, the MTS tool is only effective when there is a sufficient number of non-zero transform coefficients in the transform block. In this case, an additional criterion is used for signaling the MTS syntax element.

In some embodiments, the additional criterion includes that there are at least a minimum number of non-zero transform coefficients in the transform block (e.g., the MTS_CU_flag is only signaled when the above three criteria are met, and when there are at least a minimum number of non-zero transform coefficients in the entire transform block). During decoding, the video decoder only receives and parses the MTS syntax element (e.g., MTS_CU_flag) when the number of non-zero transform coefficients exceeds a predefined threshold. If there does not exist the minimum number of non-zero transform coefficients, the video decoder sets MTS_CU_flag to 0 and applies inverse DCT2 transform to the transform block. For example, in the transform block 600, assuming that the minimum number of non-zero transform coefficient for enabling MTS is two, MTS can be enabled for the transform block 600 since there are three non-zero coefficients.

In some embodiments, the MTS syntax element is conditionally signaled based on the scan order index of the last non-zero transform coefficient in the transform block. For example, in FIG. 6, the scan order index of the last non-zero transform coefficient (the 3rd non-zero coefficient 610) is N. As a result, the video encoder or decoder does not have to count all the non-zero transform coefficients to determine if the number of non-zero coefficients in the transform block exceeds the predefined threshold (which can cause non-negligible computational complexity increase when parsing the luma residuals). Specifically, MTS is only used for a transform block when the scan order index (i.e., N) of the last non-zero coefficient exceeds a predefined threshold (e.g., three). If the scan order index of the last non-zero transform coefficient is greater than the predefined threshold, the MTS_CU_flag is signaled to indicate the particular transforms used (e.g., according to table 500 of FIG. 5). On the other hand, if the index position of the last non-zero transform coefficient is not greater than the predefined threshold, MTS_CU_flag is not signaled and inferred to be zero (e.g., DCT2 is used). With this approach, only one check per transform block is performed prior to parsing the MTS syntax element. Table 1 below illustrates the syntax table used for coding unit and transform unit when this method is applied to condition MTS signaling with the related changes being underlined. In Table 1, a Boolean variable MtsLastSigCoeffPosMetThresholdFlag is used to represent if the index position of the last non-zero coefficient is greater the predefined threshold so that the MTS_CU_flag is allowed to be signaled for the given transform block.

TABLE 1

Modified syntax table of coding unit and transform unit for the MTS signaling

| | Descriptor |
|---|---|
| coding_unit( x0, y0, cbWidth, cbHeight, cqtDepth, treeType, modeType ) { <br> ...... <br>   if( sps_act_enabled_flag  &&  CuPredMode[ chType ][ x0 ][ y0 ]  != MODE_INTRA  && <br>     treeType  = =  SINGLE_TREE ) <br>     cu_act_enabled_flag <br>   LfnstDcOnly = 1 <br>   LfnstZeroOutSigCoeffFlag = 1 <br>     MtsLastSigCoeffPosMetThresholdFlag = 0 <br>   MtsZeroOutSigCoeffFlag = 1 <br>   transform_tree( x0, y0, cbWidth, cbHeight, treeType, chType) <br> ...... <br>     if( treeType  !=  DUAL_TREE_CHROMA  &&  lfnst_idx  = =  0 | <br> <br> ae(v) |

TABLE 1-continued

Modified syntax table of coding unit and transform unit for the MTS signaling

|  | Descriptor |
|---|---|
| &&<br>    transform_skip_flag[ x0 ][ y0 ][ 0 ] == 0 && Max( cbWidth, cbHeight) <= 32 &&<br>    IntraSubPartitionsSplit[ x0 ][ y0 ] == ISP_NO_SPLIT && cu_sbt_flag == 0 &&<br>    MtsZeroOutSigCoeffFlag == 1 &&<br>MtsLastSigCoeffPosMetThresholdFlag == 1 && tu_cbf_luma[ x0 ][ y0 ] ) {<br>      if( ( ( CuPredMode[ chType ][ x0 ][ y0 ] == MODE_INTER &&<br>        sps_explicit_mts_inter_enabled_flag ) \|\|<br>        ( CuPredMode[ chType ][ x0 ][ y0 ] == MODE_INTRA &&<br>        sps_explicit_mts_intra_enabled_flag ) ) )<br>        mts_idx<br>    }<br>}<br>......<br>residual_coding( x0, y0, log2TbWidth, log2TbHeight, cIdx ) {<br>......<br>  if( lastSubBlock == 0 && log2TbWidth >= 2 && log2TbHeight >= 2 &&<br>    !transform_skip_flag[ x0 ][ y0 ][ cIdx ] && lastScanPos > 0 )<br>    LfnstDcOnly = 0<br>  if( ( lastSubBlock > 0 && log2TbWidth >= 2 && log2TbHeight >= 2 ) \|\|<br>    ( lastScanPos >7 && ( log2TbWidth ==2 \|\| log2TbWidth == 3 ) &&<br>    log2TbWidth == log2TbHeight ) )<br>    LfnstZeroOutSigCoeffFlag = 0<br>    <u>if( lastSubBlock > 0 \|\| lastScanPos > $T_{pos}$)</u><br>      <u>MtsLastSigCoeffPosMetThresholdFlag = 1</u><br>  if( ( <u>LastSignificantCoeffX > 15</u> \|\| <u>LastSignificantCoeffY >15</u> ) && cIdx == 0 )<br>    MtsZeroOutSigCoeffFlag = 0<br>......<br>} | ae(v) |

As mentioned in description related to FIG. 5, under MTS the transform coefficients (e.g., high frequency transform coefficients) outside a predefined top-left region (e.g., the top-left 16×16 region, also known as non-zero region) in a transform block are forced to be zeros when either width or height of the transform block is larger than a predefined value (e.g., 16) (e.g., this region is also known as the zero-out region). For example, in FIG. 6, the 2nd region 604 may be the zero-out region and the 1st region 602 may be the non-zero region. MTS_CU_flag is only signaled when both the horizontal and vertical coordinates of the last non-zero coefficient (e.g., 3rd non-zero coefficient 610) are smaller than the predefined value (e.g., 16), indicating that the last non-zero coefficient is within the non-zero region. However, due to the fact that the transform coefficients are scanned based on diagonal scan order, such MTS signaling condition cannot guarantee that all the non-zero transform coefficients are always located inside the predefined top-left region (e.g., although not shown in FIG. 6, one or more non-zero coefficient before the last non-zero coefficient may reside in the 2nd region 604). Therefore, additional checks are needed to ensure that all non-zero coefficients are inside the non-zero region (e.g., the 1st region 602).

In some embodiments, an example of additional checks includes a bitstream conformance constraint such that the value of the MTS index, i.e., mts_idx, has to be zero (i.e., DCT2 is used by default) when there is any non-zero coefficient inside the MTS zero-out region (e.g., the 2nd region 604).

In some embodiments, the MTS index is signaled depending on whether there are non-zero coefficients located outside the top-left region (e.g., min(TUWidth, 16)×min(TUHeight, 16)). If yes, the MTS index is not signaled and always inferred as 0; otherwise, the MTS index is signaled into bitstream to indicate what transforms are used.

Instead of checking each scan position, the decision on whether there is any non-zero coefficient in the zero-out region can be made by checking the CBFs at coding group (CG) level. Specifically, the signaling of the MTS index is omitted if any CG of the current TB located within the zero-out region has a CBF value equal to one (i.e., there is non-zero coefficient within the CG). Table 2 below illustrates the modified syntax table of transform unit when the above-mentioned MTS signaling constraint is applied (comparing to the current VVC specification), where changes related to the proposed constrained MTS signaling are underlined.

TABLE 2

Proposed transform unit syntax table for the MTS signaling

|  | Descriptor |
|---|---|
| residual_coding( x0, y0, log2TbWidth, log2TbHeight, cIdx ) {<br>......<br>  if( lastSubBlock == 0 && log2TbWidth >= 2 && log2TbHeight >= 2 && |  |

TABLE 2-continued

Proposed transform unit syntax table for the MTS signaling

|  | Descriptor |
|---|---|

```
        !transform_skip_flag[ x0 ][ y0 ][ cIdx ]   &&   lastScanPos   >   0 )
      LfnstDcOnly = 0
    if( ( lastSubBlock > 0   &&   log2TbWidth >= 2   &&
log2TbHeight >= 2 )   | |
        ( lastScanPos > 7   &&   ( log2TbWidth = = 2   | |   log2TbWidth = =
3 )   &&
      log2TbWidth = = log2TbHeight ) )
      LfnstZeroOutSigCoeffFlag = 0
    QState = 0
    for( i = lastSubBlock; i   >=   0; i- - ) {
      startQStateSb = QState
      xS =
DiagScanOrder[ log2TbWidth − log2SbW ][ log2TbHeight − log2SbH ]
            [ i ][ 0 ]
      yS =
DiagScanOrder[ log2TbWidth − log2SbW ][ log2TbHeight − log2SbH ]
            [ i ][ 1 ]
      inferSbDcSigCoeffFlag = 0
      if( i < lastSubBlock   &&   i > 0 ) {
        coded_sub_block_flag[ xS ][ yS ]                                      ae(v)
        inferSbDcSigCoeffFlag = 1
      }
          if( ( xS > 3 || yS > 3 ) && coded_sub_block_flag[xS][yS]) {
              MtsZeroOutSigCoeffFlag = 0
          }
      firstSigScanPosSb = numSbCoeff
      lastSigScanPosSb = −1
      firstPosMode0 = ( i   = =   lastSubBlock   ? lastScanPos :
numSbCoeff − 1 )
      firstPosMode1 = firstPosMode0
      for( n = firstPosMode0; n   >=   0   &&   remBinsPass1 >= 4; n- - )
{
        xC = ( xS << log2SbW ) +
DiagScanOrder[ log2SbW ][ log2SbH ][ n ][ 0 ]
        yC = ( yS << log2SbH ) +
DiagScanOrder[ log2SbW ][ log2SbH ][ n ][ 1 ]
        if( coded_sub_block_flag[ xS ][ yS ]   &&   ( n > 0   | |
!inferSbDcSigCoeffFlag ) &&
            ( xC != LastSignificantCoeffX   | |   yC != Last SignificantCoeffY
) ) {
          sig_coeff_flag[ xC ][ yC ]                                          ae(v)
          remBinsPass1- -
          if( sig_coeff_flag[ xC ][ yC ] )
            inferSbDcSigCoeffFlag = 0
        }
        if( sig_coeff_flag[ xC ][ yC ] ) {
          abs_level_gtx_flag[ n ][ 0 ]                                        ae(v)
          remBinsPass1- -
          if( abs_level_gtx_flag[ n ][ 0 ] ) {
            par_level_flag[ n ]                                               ae(v)
            remBinsPass1- -
            abs_level_gtx_flag[ n ][ 1 ]                                      ae(v)
            remBinsPass1- -
          }
          if( lastSigScanPosSb   = =   −1 )
            lastSigScanPosSb = n
          firstSigScanPosSb = n
        }
        AbsLevelPass1[ xC ][ yC ] = sig_coeff_flag[ xC ][ yC ] +
par_level_flag[ n ] +
              abs_level_gtx_flag[ n ][ 0 ] +
2 * abs_level_gtx_flag[ n ][ 1 ]
        if( pic_dep_quant_enabled_flag )
          QState = QStateTransTable[ QState ][ AbsLevelPass1[ xC ][ yC ]
& 1 ]
        firstPosMode1 = n − 1
      }
......
    }
}
```

In some embodiments, transform skip mode can be independently applied to the luma and chroma components by signaling three transform skip flags in bitstream, one for each component. However, in the current design, it is prohibited to apply transform skip mode to chroma components when the chroma residuals of the current TU are coded with the JCCR mode. Because the transform skip and the JCCR are applied at the different stages when reconstructing the chroma residuals, the two coding tools can be enabled simultaneously. Therefore, in another embodiment of the disclosure, it is proposed to enable the chroma transform skip mode when the chroma residuals in one TU are coded with the JCCR mode.

Figure 7:
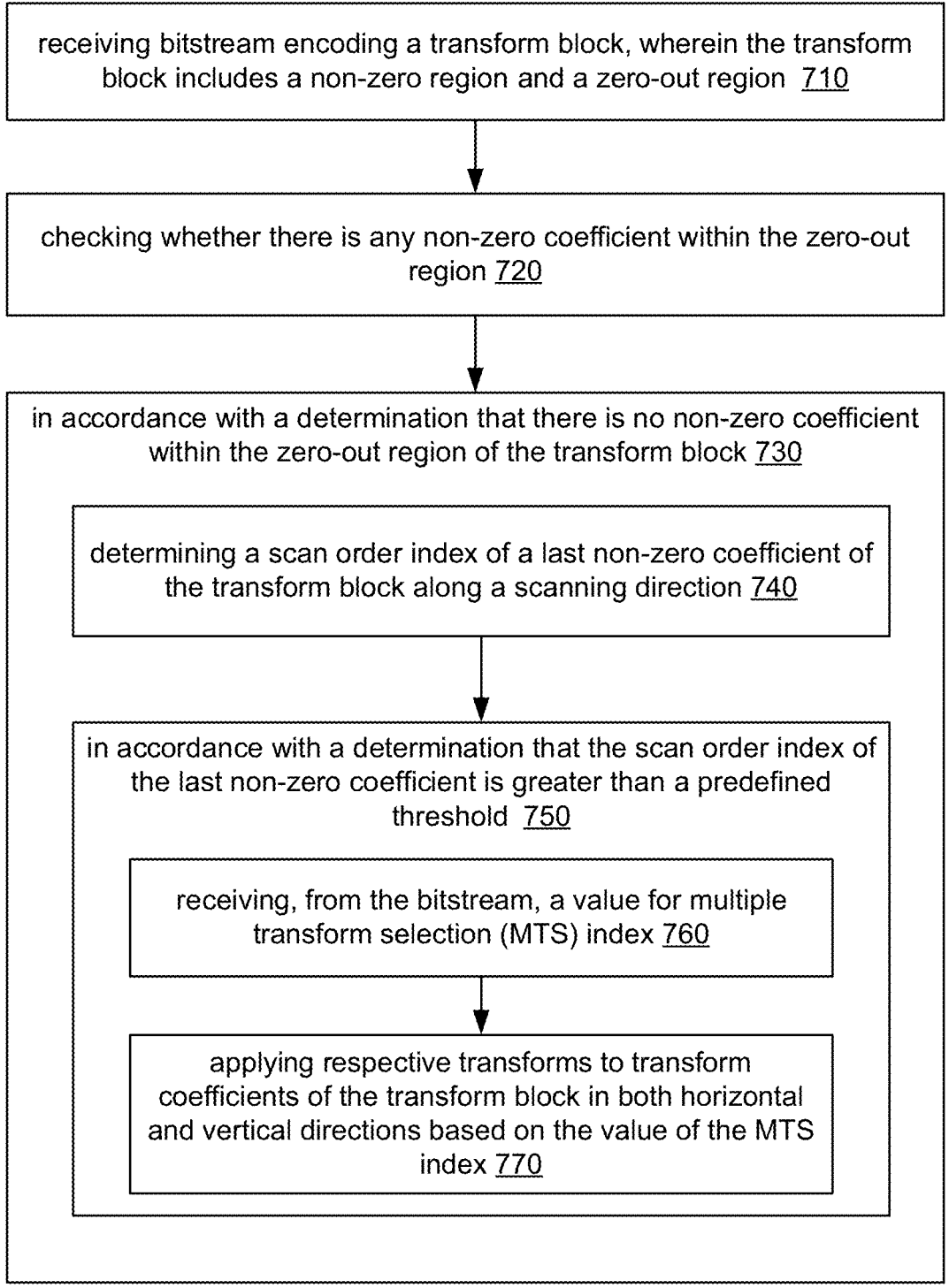
FIG. 7 is a flowchart illustrating an exemplary process by which a video coder implements the techniques of coding block residuals using a multiple transform selection (MTS) scheme in accordance with some implementations of the present disclosure.

FIG. 7 is a flowchart illustrating an exemplary process 700 by which a video coder implements the techniques of coding block residuals using a multiple transform selection (MTS) scheme in accordance with some implementations of the present disclosure. For convenience of description, the process 700 is described as being performed by a video decoder, e.g., the video decoder 30 of FIG. 3. During the process 700, the signaling of MTS is conditioned on the position of a last non-zero coefficient and the existence of non-zero coefficients in different regions of a transform block.

As the first step, the video decoder 30 receives bitstream encoding a transform block, wherein the transform block includes a non-zero region (e.g., the top left 16×16 region) and a zero-out region (e.g., area outside the top left 16×16 region) (710).

Next, the video decoder 30 checks whether there is any non-zero coefficient within the zero-out region (720).

In accordance with a determination that there is no non-zero coefficient within the zero-out region of the transform block, the video decoder 30 determines a scan order index of a last non-zero coefficient of the transform block along a scanning direction (e.g., diagonal scanning direction) (730). For example, in FIG. 6, the last non-zero coefficient of the transform block (3rd non-zero coefficient 610) has a scan order index of three.

In accordance with a determination that the scan order index of the last non-zero coefficient is greater than a predefined threshold (e.g., the Boolean variable MtsLastSigCoeffPosMetThresholdFlag=1) (740), the video decoder 30 receives, from the bitstream, a value for multiple transform selection (MTS) index (750). For example, for the transform block 600 in FIG. 6, if the predefined threshold is two, since the last non-zero coefficient, three, is greater than the predefined threshold two, the video decoder 30 will receive a value for MTS index.

Finally, the video decoder 30 applies respective transforms to transform coefficients of the transform block in both horizontal and vertical directions based on the value of the MTS index (760). For example, as described in FIG. 5 and the related description, if MTS_CU_flag has the value of 0, the video decoder applies inverse DCT2 transform to the transform block. If the MTS_CU_flag has a value of 1, the video decoder further receives additional syntax elements (e.g., MTS_Hor_flag or MTS_Ver_flag) and selectively applies inverse DST7 or DCT8 to the transform block.

In some embodiments, in accordance with a determination that the scan order index of the last non-zero coefficient is not greater than the predefined threshold, the video decoder 30 applies a default transform to the transform block (e.g., DCT-2).

In some embodiments, the video decoder 30 applies the respective transforms to the transform block based on the value of the MTS index by: in accordance with a determination that the MTS index has a first value (e.g., 1), receiving, from the bitstream, a value for a MTS horizontal flag (e.g., MTS_Hor_flag) and a value for a MTS vertical flag (e.g., MTS_Ver_flag), applying a horizontal transform to the coefficients of the transform block in the horizontal direction based on the value for the MTS horizontal flag (e.g., DST-7 if MTS_Hor_flag==0 and DCT-8 if MTS_Hor_flag==1); and applying a vertical transform to the coefficients of the transform block after the horizontal transform in the vertical direction based on the value for the MTS vertical flag (e.g., DST-7 if MTS_Ver_flag==0 and DCT-8 if MTS_Ver_flag==1); and in accordance with a determination that the MTS index has a second value (e.g., 0), transforming the transform block using a default transform (e.g., DCT-2) in both the horizontal and vertical directions.

In some embodiments, the video decoder 30 checks whether there is any non-zero coefficient within the zero-out region by checking coded block flags (CBFs) of luma coefficient groups within the zero-out region and determining that there is no non-zero coefficient within the zero-out region only if the CBFs of all the luma coefficient groups within the zero-out region are zero. For example, if the CBF of one luma coefficient group within the zero-out region is one, then there is at least one non-zero coefficient within the zero-out region and no MTS index is signaled.

In some embodiments, the video decoder 30 checks whether there is any non-zero coefficient within the zero-out region by checking horizontal coordinate and vertical coordinate of the last non-zero coefficient and determining that there is at least one non-zero coefficient within the zero-out region when either the horizontal coordinate or the vertical coordinate of the last non-zero coefficient is within the zero-out region. For example, if the horizontal coordinate or the vertical coordinate of the last non-zero coefficient is within the zero-out region, there is at least one non-zero coefficient within the zero-out region.

In some embodiments, chroma residuals of the transform block are coded in joint coding of chroma residuals (JCCR) mode and chroma transform skip mode is enabled for the transform block.

In some embodiments, the non-zero region is a top-left 16×16 region of the transform block.

In some embodiments, the scan order is a diagonal scan order.

As described above, the motivation of using MTS is to achieve a better energy compaction of residual samples using other core transforms in DCT/DST transforms. The residuals resulting from different prediction modes may present different characteristics. In some embodiments, it may not be beneficial to use MTS for all the prediction modes. For instance, there are usually more correlation between the samples in temporal domain than in spatial domain and inter prediction samples, therefore, often have better prediction efficiency than intra prediction samples. In other words, the magnitude of residuals for inter prediction blocks is often smaller than that of intra prediction blocks. In this case, the MTS mode may be disabled for inter coding blocks. Specifically, when the current coding block is intra coded, the syntax mts_idx is parsed to determine whether the non-DCT2 transform is applied to the current coding block or not; otherwise, when the current coding block is inter coded, syntax mts_idx is not parsed but always inferred to be 0, i.e., only DCT2 transform can be applied. The corresponding syntax table with the proposed method is specified as follows:

TABLE 3

Additional Proposed transform unit syntax table for the MTS signaling

|  | Descriptor |
|---|---|
| coding_unit( x0, y0, cbWidth, cbHeight, cqtDepth, treeType, modeType ) { <br> ... ... <br>     if( treeType != DUAL_TREE_CHROMA && lfnst_idx == 0 && <br>         transform_skip_flag[ x0 ][ y0 ][ 0 ] == 0 && Max ( cbWidth, cbHeight) <= 32 && <br>         IntraSubPartitionsSplit[ x0 ][y0 ] == ISP_NO_SPLIT && cu_sbt_flag == 0 && <br>         MtsZeroOutSigCoeffFlag == 1 && tu_cbf_luma[ x0 ][ y0 ] ) { <br>         if( CuPredMode[ chType ][ x0 ][ y0 ] == MODE_INTRA && <br>           sps_explicit_mts_enabled_flag ) <br>             mts_idx <br>     } <br> ... ... <br> } |  <br><br><br><br><br><br><br><br><br>ae(v)|

Figure 8:
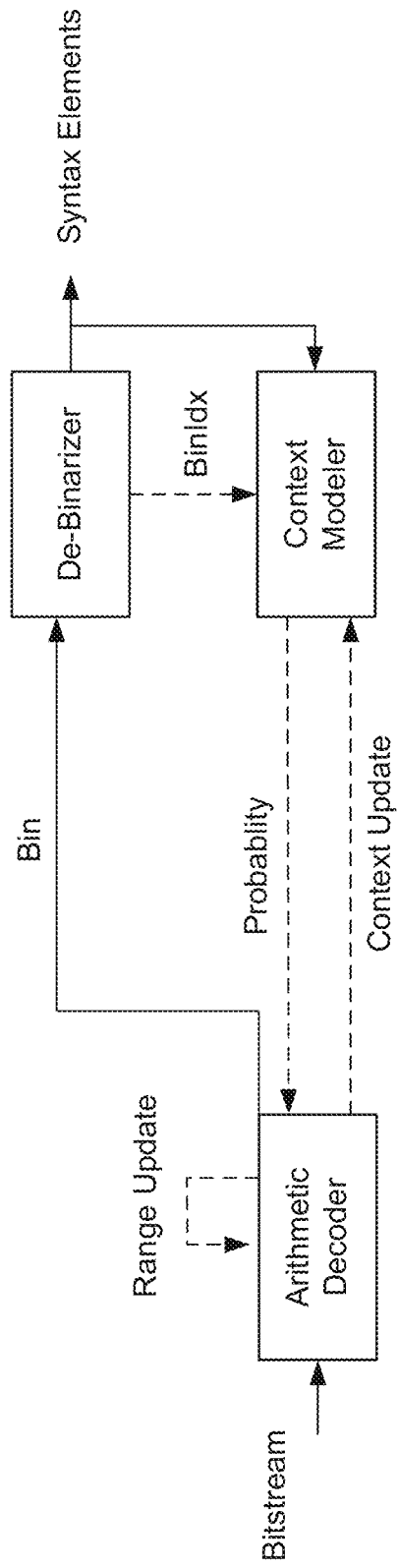
FIG. 8 is a block diagram illustrating an example Context-adaptive binary arithmetic coding (CABAC) engine in accordance with some implementations of the present disclosure.

FIG. 8 is a block diagram illustrating an exemplary context-adaptive binary arithmetic coding (CABAC) engine in accordance with some implementations of the present disclosure.

Context-adaptive binary arithmetic coding (CABAC) is a form of entropy coding used in many video coding standards, e.g. H.264/MPEG-4 AVC, High Efficiency Video Coding (HEVC) and VVC. CABAC is based on arithmetic coding, with a few innovations and changes to adapt it to the needs of video coding standards. For example, CABAC codes binary symbols, which keeps the complexity low and allows probability modelling for more frequently used bits of any symbol. Probability models are selected adaptively based on local context, allowing better modelling of probabilities, because coding modes are usually locally well correlated. Finally, CABAC uses a multiplication-free range division by the use of quantized probability ranges and probability states.

CABAC has multiple probability modes for different contexts. It first converts all non-binary symbols to binary. Then, for each bin (or termed bit), the coder selects which probability model to use, then uses information from nearby elements to optimize the probability estimate. Arithmetic coding is finally applied to compress the data.

The context modeling provides estimates of conditional probabilities of the coding symbols. Utilizing suitable context models, a given inter-symbol redundancy can be exploited by switching between different probability models according to already-coded symbols in the neighborhood of the current symbol to encode. Coding a data symbol involves the following stages.

Binarization: CABAC uses Binary Arithmetic Coding which means that only binary decisions (1 or 0) are encoded. A non-binary-valued symbol (e.g. a transform coefficient or motion vector) is "binarized" or converted into a binary code prior to arithmetic coding. This process is similar to the process of converting a data symbol into a variable length code but the binary code is further encoded (by the arithmetic coder) prior to transmission. Stages are repeated for each bin (or "bit") of the binarized symbol.

Context model selection: A "context model" is a probability model for one or more bins of the binarized symbol. This model may be chosen from a selection of available models depending on the statistics of recently coded data symbols. The context model stores the probability of each bin being "1" or "0".

Arithmetic encoding: An arithmetic coder encodes each bin according to the selected probability model. Note that there are just two sub-ranges for each bin (corresponding to "0" and "1").

Probability update: The selected context model is updated based on the actual coded value (e.g. if the bin value was "1", the frequency count of "1"s is increased).

By decomposing each non-binary syntax element value into a sequence of bins, further processing of each bin value in CABAC depends on the associated coding-mode decision, which can be either chosen as the regular or the bypass mode. The latter is chosen for bins, which are assumed to be uniformly distributed and for which, consequently, the whole regular binary arithmetic encoding (and decoding) process is simply bypassed. In the regular coding mode, each bin value is encoded by using the regular binary arithmetic coding engine, where the associated probability model is either determined by a fixed choice, based on the type of syntax element and the bin position or bin index (binIdx) in the binarized representation of the syntax element, or adaptively chosen from two or more probability models depending on the related side information (e.g. spatial neighbors, component, depth or size of CU/PU/TU, or position within TU). Selection of the probability model is referred to as context modeling. As an important design decision, the latter case is generally applied to the most frequently observed bins only, whereas the other, usually less frequently observed bins, will be treated using a joint, typically zero-order probability model. In this way, CABAC enables selective adaptive probability modeling on a sub-symbol level, and hence, provides an efficient instrument for exploiting inter-symbol redundancies at significantly reduced overall modeling or learning costs. Note that for both the fixed and the adaptive case, in principle, a switch from one probability model to another can occur between any two consecutive regular coded bins. In general, the design of context models in CABAC reflects the aim to find a good compromise between the conflicting objectives of avoiding unnecessary modeling-cost overhead and exploiting the statistical dependencies to a large extent.

The parameters of probability models in CABAC are adaptive, which means that an adaptation of the model probabilities to the statistical variations of the source of bins is performed on a bin-by-bin basis in a backward-adaptive and synchronized fashion both in the encoder and decoder; this process is called probability estimation. For that purpose, each probability model in CABAC can take one out of 126 different states with associated model probability values p ranging in the interval [0:01875; 0:98125]. The two parameters of each probability model are stored as 7-bit entries in a context memory: 6 bits for each of the 63 probability states representing the model probability pLPS of the least probable symbol (LPS) and 1 bit for nMPS, the value of the most probable symbol (MPS).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method for video encoding, comprising:
    determining whether any coding group of a transform block located within a zero-out region has a non-zero coefficient, wherein the transform block comprises a non-zero region and the zero-out region; and
    in accordance with a determination that no coding group of the transform block located within the zero-out region has a non-zero coefficient:
    applying respective inverse transforms to transform coefficients of the transform block in both horizontal and vertical directions.

2. The method of claim 1, further comprising:
    in accordance with a determination that a coding group of the transform block located within the zero-out region has a non-zero coefficient:
    applying a predefined default inverse transform to the transform coefficients of the transform block in both the horizontal and vertical directions.

3. The method of claim 2, wherein the predefined default inverse transform is inverse DCT-2 transform and the respective inverse transforms comprise inverse DST-7 transform and inverse DCT-8 transform.

4. The method of claim 1, wherein chroma residuals of the transform block are coded in joint coding of chroma residuals (JCCR) mode and a transform skip mode is enabled for a corresponding chroma transform block.

5. The method of claim 1, wherein the non-zero region is a top-left 16×16 region of the transform block.

6. The method of claim 1, wherein a scan order of the coefficients of the transform block is a diagonal scan order.

7. An electronic apparatus comprising:
    one or more processing units;
    memory coupled to the one or more processing units; and
    a plurality of programs stored in the memory that, when executed by the one or more processing units, cause the electronic apparatus to perform a method for video encoding, the method including:
    determining whether any coding group of a transform block located within a zero-out region has a non-zero coefficient, wherein the transform block comprises a non-zero region and the zero-out region; and
    in accordance with a determination that no coding group of the transform block located within the zero-out region has a non-zero coefficient:
    applying respective inverse transforms to transform coefficients of the transform block in both horizontal and vertical directions.

8. The electronic apparatus of claim 7, wherein the method further comprises:
    in accordance with a determination that a coding group of the transform block located within the zero-out region has a non-zero coefficient:
    applying a predefined default inverse transform to the transform coefficients of the transform block in both the horizontal and vertical directions.

9. The electronic apparatus of claim 8, wherein the predefined default inverse transform is inverse DCT-2 transform and the respective inverse transforms comprise inverse DST-7 transform and inverse DCT-8 transform.

10. The electronic apparatus of claim 8, wherein chroma residuals of the transform block are coded in joint coding of chroma residuals (JCCR) mode and a transform skip mode is enabled for a corresponding chroma transform block.

11. The electronic apparatus of claim 8, wherein the non-zero region is a top-left 16×16 region of the transform block.

12. The electronic apparatus of claim 8, wherein a scan order of the coefficients of the transform block is a diagonal scan order.

13. A non-transitory computer readable storage medium storing a bitstream generated by a method for video encoding, the method including:
    determining whether any coding group of a transform block located within a zero-out region has a non-zero coefficient, wherein the transform block comprises a non-zero region and the zero-out region; and
    in accordance with a determination that no coding group of the transform block located within the zero-out region has a non-zero coefficient:
    applying respective inverse transforms to transform coefficients of the transform block in both horizontal and vertical directions.

14. The non-transitory computer readable storage medium of claim 13, wherein the method further comprises:
    in accordance with a determination that a coding group of the transform block located within the zero-out region has a non-zero coefficient:
    applying a predefined default inverse transform to the transform coefficients of the transform block in both the horizontal and vertical directions.

15. The non-transitory computer readable storage medium of claim 14, wherein the predefined default inverse transform is inverse DCT-2 transform and the respective inverse transforms comprise inverse DST-7 transform and inverse DCT-8 transform.

16. The non-transitory computer readable storage medium of claim 13, wherein chroma residuals of the transform block are coded in joint coding of chroma residuals (JCCR) mode and a transform skip mode is enabled for a corresponding chroma transform block.

17. The non-transitory computer readable storage medium of claim 13, wherein the non-zero region is a top-left 16×16 region of the transform block.

18. The non-transitory computer readable storage medium of claim 13, wherein a scan order of the coefficients of the transform block is a diagonal scan order.

* * * * *